Jan. 18, 1955     A. W. EXCELL     2,699,892
ADD-SUBTRACT CALCULATING MACHINE

Filed Jan. 10, 1952     7 Sheets-Sheet 1

Inventor
ARTHUR W. EXCELL
By
Attorney

Jan. 18, 1955     A. W. EXCELL     2,699,892
ADD-SUBTRACT CALCULATING MACHINE
Filed Jan. 10, 1952     7 Sheets-Sheet 2
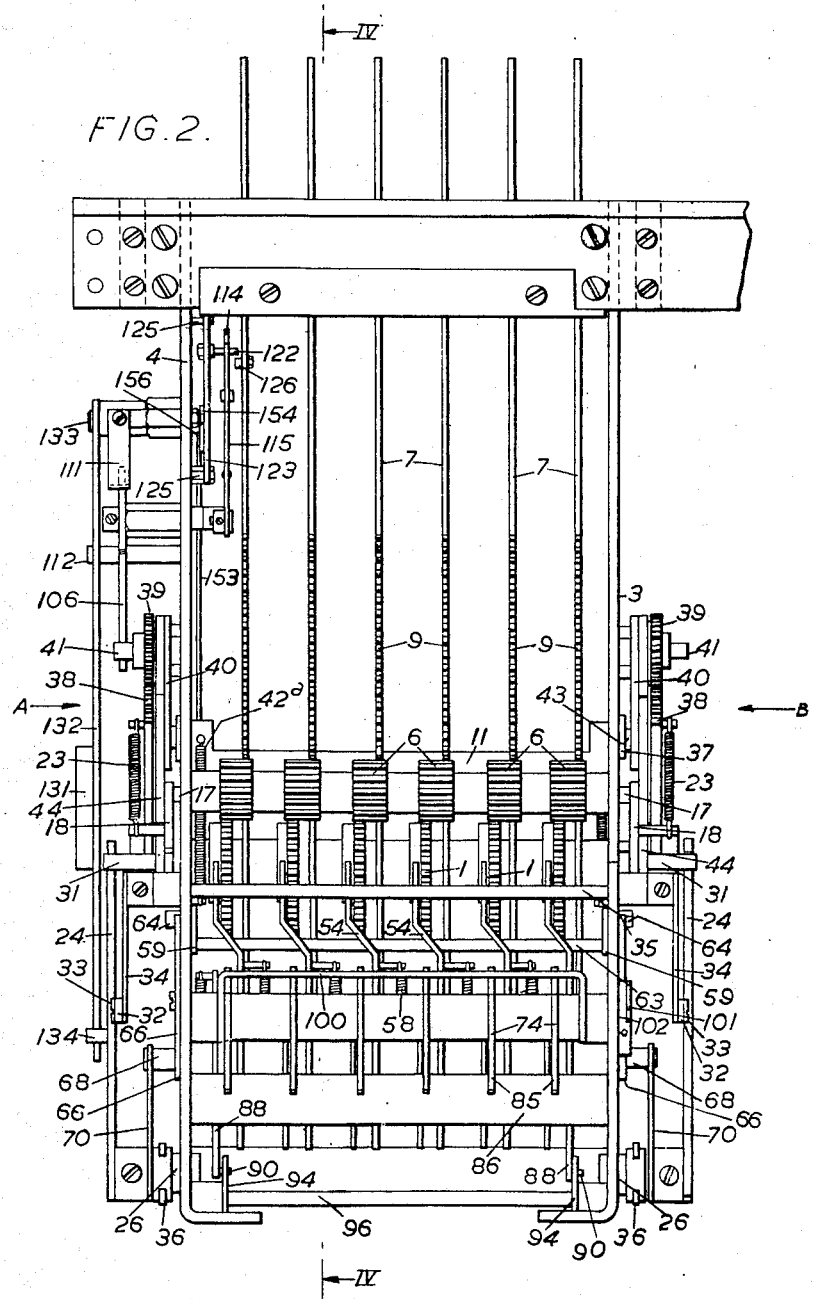
Inventor
ARTHUR W. EXCELL
By
*Attorney*

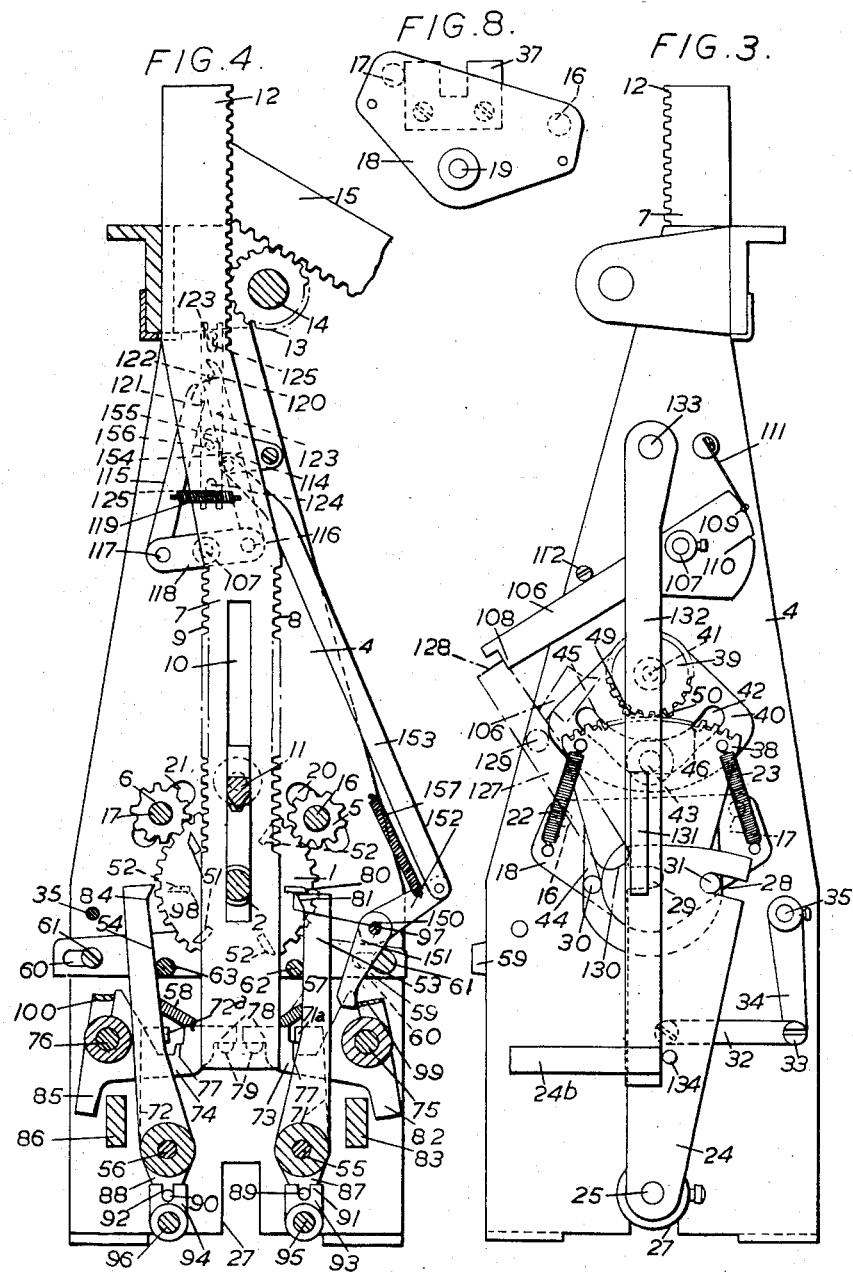

Jan. 18, 1955
A. W. EXCELL
2,699,892
ADD-SUBTRACT CALCULATING MACHINE
Filed Jan. 10, 1952
7 Sheets-Sheet 4
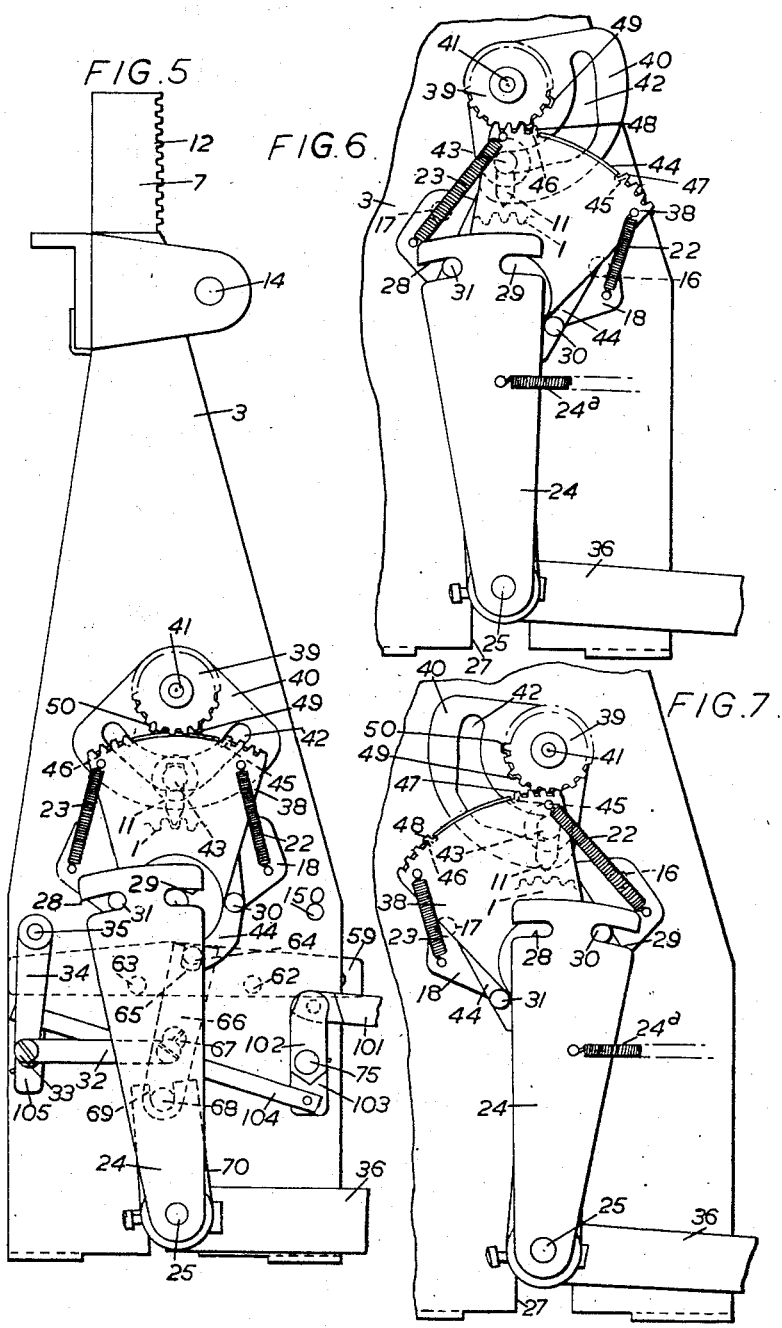
Inventor
ARTHUR W. EXCELL
By *Jno Emirie*
Attorney Jan. 18, 1955 A. W. EXCELL 2,699,892
ADD-SUBTRACT CALCULATING MACHINE
Filed Jan. 10, 1952 7 Sheets-Sheet 5

Inventor
ARTHUR W. EXCELL
By
Attorney

Jan. 18, 1955     A. W. EXCELL     2,699,892
ADD-SUBTRACT CALCULATING MACHINE
Filed Jan. 10, 1952     7 Sheets-Sheet 7
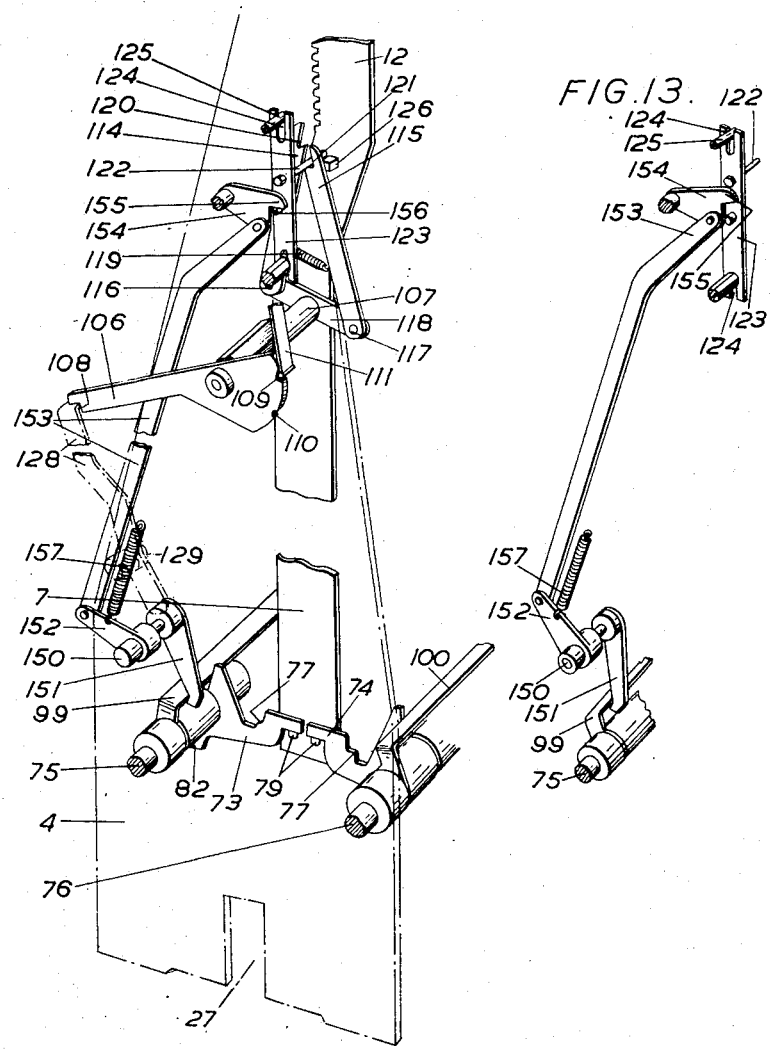
Inventor
ARTHUR W. EXCELL
By
Attorney

United States Patent Office 2,699,892
Patented Jan. 18, 1955

2,699,892

ADD-SUBTRACT CALCULATING MACHINE

Arthur William Excell, Thornton Heath, England, assignor to Powers-Samas Accounting Machines Limited, London, England, a British company Application January 10, 1952, Serial No. 265,808

Claims priority, application Great Britain January 12, 1951

7 Claims. (Cl. 235—60.2)

This invention relates to statistical machines and in particular to an accumulator for use in such machines.

As is well understood in the art, statistical machines are of two general kinds, those which operate under the control of records such as cards and those which are controlled by a manually operated key-board. It is a main object of the present invention to provide an accumulator which can be employed in either of these two kinds of machines.

According to the present invention an accumulator for statistical machines comprises a plurality of rotatable and coaxial toothed denominational register wheels, adding and subtracting pinions constantly in mesh with each register wheel to rotate the wheel in opposite directions, a reciprocable digit entering rack for each said wheel and having teeth on opposite sides thereof for meshing engagement with said pinions, actuating means to move said rack from a starting position a number of tooth positions representative of a digit to be registered on its associated register wheel, restraining means to restrain the register wheels against rotation except during the registering of digits thereon or the reading of digits therefrom, pinion entering means selectively to move one or other of the pinions from an inactive position into meshing engagement with said rack for the purpose of registering digits on its associated register wheel or for reading digits therefrom, and carry-over means to effect a carry from a register wheel of one denomination to the next.

In order that the invention may be clearly understood one embodiment thereof will now be described by way of example with reference to the accompanying diagrammatic drawings in which:

Figure 2 is a rear elevation of Figure 1,

Figure 3 is a side elevation looking in the direction of arrow A, Figure 2,

Figure 4 is a section on line IV—IV, Figure 2,

Figure 5 is a side elevation looking in the direction of arrow B, Figure 2,

Figure 9:
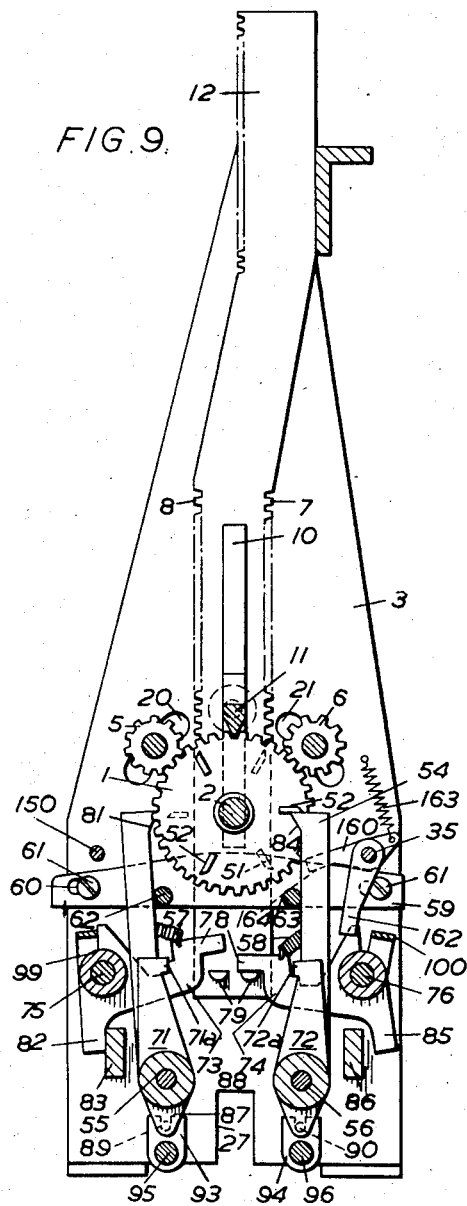
Figure 10:
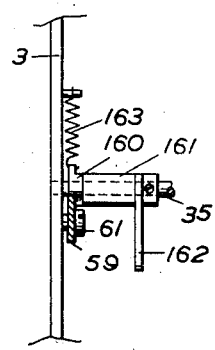

Figure 6 is a view of a part of Figure 5, showing the positions of some of the parts during a subtraction operation, Figure 7 is a view similar to Figure 6, and shows the positions of the same parts during an adding operation, Figure 8 is a detail showing a stop plate for determining the position of meshing engagement of adding and subtracting pinions with digit entering racks, Figure 9 is a view showing means for retarding restoration of a rocking plate until the digit entering racks are controlled by their restoring bars, Figure 10 is a side view of part of the mechanism shown in Figure 9.

Figure 11:
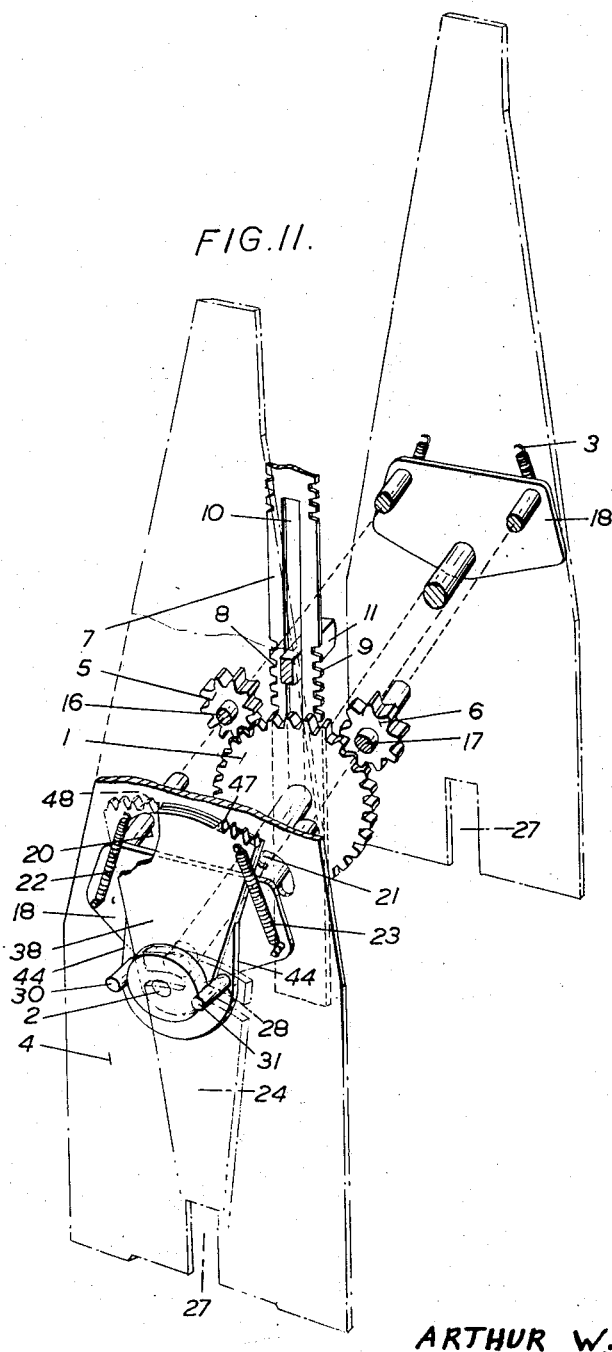

Figure 11 is a pictorial view illustrating the adding and subtracting pinions in the neutral positions thereof, Figure 12 is a pictorial view of some of the parts shown in Figure 4, and Figure 13 is a further pictorial view of some of the parts shown in Figure 12.

Figure 1:
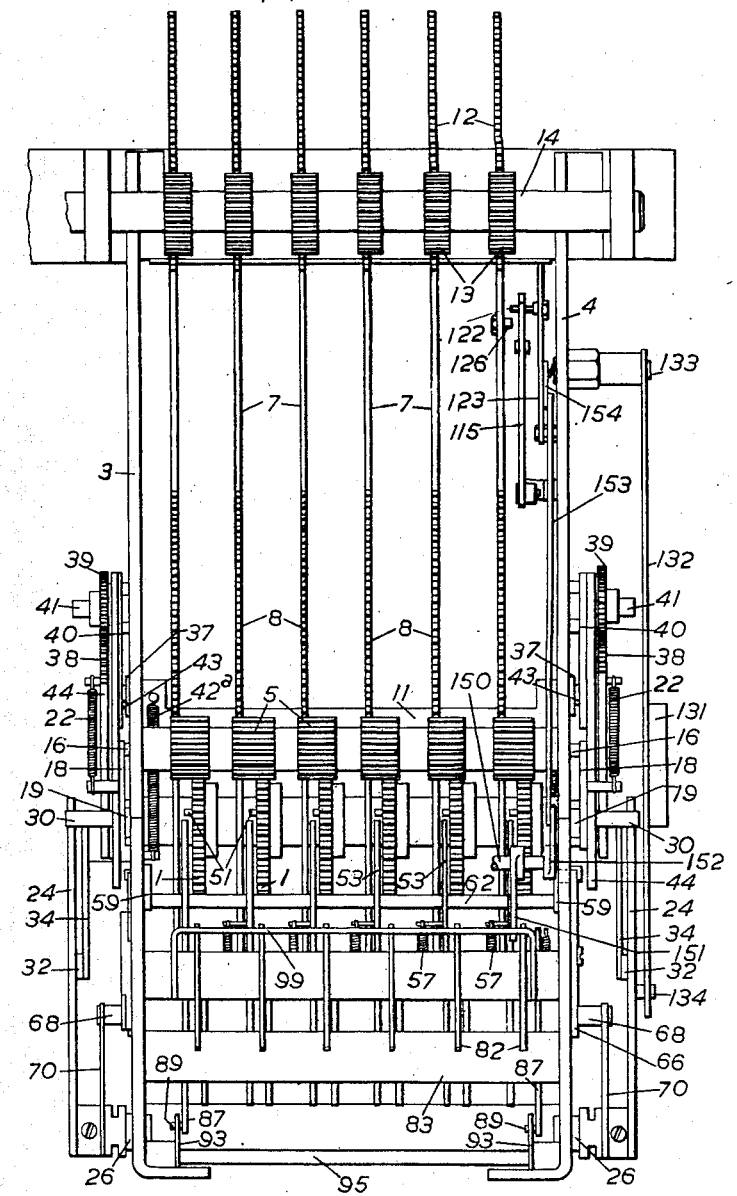
Figure 1 is a front elevation of an accumulator according to the invention.

Referring to the drawings, the accumulator illustrated therein is, as can be seen from Figures 1 and 2, adapted to accommodate six denominational orders. It will, however, be understood that an accumulator according to the invention may, as desired, be constructed to accommodate a greater or a lesser number of denominational orders.

Each denominational order of the accumulator comprises a toothed denominational register wheel 1, mounted on a fixed spindle 2 carried in side frames 3, 4, the spindle 2 being common to all the wheels 1 so that the wheels are coaxial. The coaxial wheels 1 are freely rotatable on the spindle 2 and each is provided with thirty peripheral teeth which are constantly in mesh with two pinions of which the pinion 5 will hereinafter be referred to as the adding pinion and the pinion 6 will be referred to as the subtracting pinion, the pinions being arranged to rotate the register wheels 1 in opposite directions.

Also for each register wheel 1 is provided a reciprocable digit entering rack 7 having, as will be seen from the drawings, teeth 8 and 9 on opposite sides thereof for meshing engagement with the pinions 5, 6 as will be hereinafter described. Each rack is a thin flat plate or strip and is provided with a slot 10 extending lengthwise thereof. The slots 10 in the racks embrace the spindle 2 and an aligner bar 11 which is common to each of the register wheels 1. At the upper end of the rack are further teeth 12 which are constantly in mesh with a gear wheel 13, the gear wheels 13 being freely rotatable about a fixed spindle 14 mounted in brackets fixed to the side frames 3, 4. Also in mesh with each gear wheel 13 is a toothed actuating member 15 which may be operated under key control or under record card control, as will be well understood in the art, to effect movement of the rack through teeth 12, 8, 9, representative of a digit to be registered on or subtracted from the register wheel 1 associated with the rack 7.

The pinions 5, 6 are freely rotatable on spindles 16, 17, secured to carrier members 18 pivoted at 19, Figures 1 and 11, on the spindle 2, and the spindles 16, 17 extend through arcuate slots 20, 21 in the frames 3, 4 Figures 3, 4 and 11. The carrier members 18 are controlled by springs 22, 23, Figures 3, 5 and 11 which urge the carrier members to a neutral position as shown in Figures 4 and 11, in which position the pinions 5, 6 are, as always, in mesh with the register wheel 1, but are in their inactive positions in relation to the rack 7, as shown in Figures 4 and 11.

To engage one or other of the sets of pinions 5, 6 with their associated racks 7, there is provided at each end of the accumulator a rocking plate 24 fixed on a pin 25 journalled in a block 26, Figures 1 and 2, mounted for vertical sliding movement in a slot 27, Figures 3 to 7, at the bottom of the side frames. The rocking plate has two slots 28, 29, one of which can be engaged with a pin 30 fixed to a plate 44 riveted to the back of a toothed quadrant 38 as described below and shown in Figures 3 and 6, and the other of which can be engaged with a pin 31 also fixed to the plate 44 as shown in Figure 7. The rocking plate is always engaging one or other of the pins 30, 31 according as to whether the accumulator is conditioned for addition or subtraction. Normally, under the action of a spring 24a, Figures 6 and 7, the accumulator will be conditioned for addition as shown in Figure 7, but in Figures 3, 5 and 6 it is shown conditioned for subtraction.

The rocking plates 24 are connected for simultaneous operation by links 32, Figures 3 and 5 which are each at one end connected to a plate 24 and, at their other ends, connected at 33 to arms 34 secured to a rocking spindle 35 journalled in the side frames 3, 4.

The rocking plates 24 are selectively conditioned for subtraction operations by a member 24b, Figure 3, which receives an impulse from the main shaft of the machine, thus causing it to be moved lengthwise to engage a pin 134 on the plate 24 to rock the plate to the position shown in Figure 3. Normally, the member 24b is out of alignment with the pin 134 but as will be well understood in the art, the member 24b may be aligned with the pin 134, when the accumulator is to be conditioned for subtraction by an impulse generated under control of a key or as the result of a sensing of a control hole in a record card.

Normally the register wheels 1 are restrained against angular movement about the spindle 2 by the aligner bar 11 as shown in Figure 4 and they are so restrained while the racks 7 are moved downwards from their starting positions, which position, except when a carry has been effected during the preceding registering cycle, as will be described below, is the zero position. After the racks have completed their downward movement, the appropriate pinions 5 or 6 are rolled over the register wheels until they are also in mesh with the teeth 8 or 9 of the racks 7 and the aligner bar 11 is raised out of engagement with the register wheels 1 so that the wheels are conditioned to register the digits determined by the extent of downward movement of the racks 7. As stated above, the rocking plate 24 is always engaged with the pin 30 or 31 and so when operating arms 36 co-operating with the blocks 26, Figures 2 and 5 to 7, are actuated by means, not shown, in timed relation with the downward movement of the racks, the rocking plates are moved upwards, thus rocking the plates 44. During this rocking of the plates 44, the springs 22, 23 cause the carrier members 18 also to rock until the spindle 16 or 17, as appropriate, is arrested by a stop plate 37, Figure 8, in which position of the spindle the pinions carried thereby are in mesh with the appropriate teeth 8 or 9 on the racks.

The movement of the plates 44 to bring the pinions into mesh with the racks is also employed to raise the aligner bar 11 out of engagement with the register wheels. This is effected by the toothed quadrants 38 co-operating with pinions 39 secured to cam quadrants 40 mounted for angular movement about a short spindle 41 fixed in the side frames 3, 4. The cam quadrants are provided with slots 42 which form cam tracks in which are located the ends 43 of the aligner bar 11.

Since it is required that the aligner bar be raised only after the pinion 5 or 6 is brought into mesh with the racks 7, the toothed quadrant has teeth only at the ends thereof as can be seen in Figures 3 and 5 to 7. The plates 44 each have two depressions 45, 46 formed in their upper edges, which depressions are aligned with the two innermost teeth 47, 48 on the quadrants 38. To the rear of each of the pinions 39 is also fixed a plate on which are formed two teeth 49, 50, one for engagement with a depression 45 and the other for engagement with a depression 46. Thus during the initial angular movement of the toothed quadrants 38, effected by the upward movement of the rocking plates 24, the pinions 39 remain stationary and do not commence angular movement until the tooth 49 or 50 is engaged in the appropriate depression 45 or 46 and the teeth of the pinions 39 are first meshed with the teeth on the quadrants 38 when a spindle 16 or 17 is arrested by the stop plates 37. This occurs before the rocking plate has reached the end of its upward movement and the continued upward movement of the plates 24 effects rotation of the pinions 39. During angular movement of the quadrants 38 to effect rotation of the pinions 39, the springs 22 or 23, as appropriate, stretch so that the aligner bar 11 can operate. On angular movement of the cam quadrants by their pinions the cam track 42 causes the aligner bar to be raised to the position shown in Figures 6 and 7 against the action of springs 42a, Figures 1 and 2.

After the pinions 5 or 6 have been put into mesh with the racks 7 and the aligner bar has been raised, the racks are restored to their starting positions by the restoring movement of the actuating members 15 and during this movement of the racks, the pinions meshing therewith are rotated a number of tooth positions equal to that by which the racks are restored and cause the register wheels 1 to be turned by an equal number of tooth positions thus registering the required digits thereon.

Each of the register wheels 1 is provided with devices for effecting a carry from one wheel to the next and these devices include three carry cams 51, Figure 4, on one side of a wheel 1 for effecting a carry from a wheel of lower denomination to the wheel of next higher denomination during an adding operation, and three carry cams 52 on the other side of the wheel for effecting a carry from a wheel of higher denomination to the wheel of next lower denomination during a subtraction operation. Also for each register wheel 1 is provided an adding carry pawl 53 and a subtracting carry pawl 54, the pawls being secured respectively to spindles 55, 56 journalled in the side frames 3, 4 and urged to active position by springs 57, 58, Figure 4, connected thereto and to carry members described below. In order that only one set of said carry pawls shall be active at any given time, there are provided sliding plates 59 having slots 60 which engage studs 61 fixed in the side frames. A pair of rods 62, 63 are carried by the sliding plates 59 and are engaged by the carry pawls 53, 54. To the plates 59 are secured pins 64, Figure 5, located in slots 65 in the upper ends of levers 66 pivoted at 67 to the side frames. The lower ends of the levers 66 have rollers 68 fixed thereto for location in slots 69 in the upper ends of arms 70 secured to the bosses of the plates 24. Accordingly, when the rocking plates 24 are actuated, the arms 70 are rocked with the rocking plate and move the sliding plate 59 to the right or to the left, as viewed in Figure 5, so that as one set of carry pawls is moved to active position, the other set is simultaneously moved to inactive position.

As can be seen from Figure 4, the carry cams 51 are disposed to be one tooth pitch in advance of the carry cams 52, the carry cams 51 for adding operations being aligned with the teeth of the register wheel which are representative of zero and the cams 52 being aligned with the teeth of the register wheel which are representative of the digit nine. Thus when the accumulator is zeroised, as shown in Figure 4, the cams 51, 52 occupy the positions shown thereon.

Secured to bosses on the carry pawls 53, 54 are latches 71, 72, one for each register wheel, and these latches have overturned portions 71a, 72a which cooperate with carry members 73, 74 freely mounted for angular movement on spindles 75, 76 journalled in the side frames 3, 4. Each carry member 73 co-operates with the pawl 53 of the next lower denomination and is connected thereto by a spring 57 while each carry member 74 co-operates with the pawl 54 of next lower denomination and is connected thereto by a spring 58.

Each of the latches 71, 72 co-operates with a step 77 on its carry member 73, 74 and each carry member also has an abutment 78 which, when the racks 7 are in their zero position as shown in Figure 4, are abutted by pins 79 fixed to the racks 7, which racks are in their starting or zero position.

As an example of the manner in which the carry is effected, let it be assumed that an adding operation is being effected and that a carry is to be effected from the units register wheel to the tens register wheel. During the upward or restoring movement of the racks 7 adding is effected, as described above, by rotation of the register wheels associated with the racks being restored and since, in the example, the units wheel is to make a carry-over a cam face 80 on the appropriate carry cam 51 will engage the sloping face 81 of the carry pawl 53 associated therewith and will rock the pawl clockwise, as viewed in Figure 4, thus moving the latch 71 out of engagement with the step 77 on the carry member 73 associated with the tens rack. Accordingly, the carry member 73 is rocked about the spindle 75 until a tail 82 thereon is arrested by a fixed bar 83. This movement of the carry member 73 raises its abutment 78 by a distance the equivalent of one tooth space on the tens rack. Thus the tens rack is restored to a position which is one tooth pitch beyond its normal starting or zero position and, through the pinion 5, rotates the tens register wheel 1 a further one tooth. Movement of the rack to the said one tooth position beyond the normal starting position of the rack is not obstructed by the other of the pins 79 on the rack because the carry member 74 associated therewith is at this time not latched by its latch 72 as the latch is held in its inactive position by reason of its associated carry pawl 54 being rendered inactive by the rod 63. Accordingly, when the rack is raised to effect a carry, the said other of the pins 79 rocks the carry member 74 associated therewith about its spindle thus permitting the carry movement of the rack.

The tripped carry members 73 or 74 are restored to their active positions, by restoring bars 99, 100 common thereto, just after the commencement of each cycle, i. e. when the racks are taking up their new positions. The restoring bars are of inverted U-form and are secured to the spindles 75, 76. Operable in timed relation with the actuating members 15, by means not shown, is an actuating link 101, Figure 5, connected to an arm 102 secured to the spindle 75 so that on operation of the actuating link 101, the spindle 75 is rocked thereby causing the carry members 73 to be restored to latching relation with their associated carry pawls 53 if the accumulator is conditioned for an adding operation. In order that the actuating link 101 may be employed to effect restoration irrespective of whether the accumulator is conditioned for adding or subtraction operations, the spindle 75 also has secured thereto an arm 103 which is connected by a link 104 to an arm 105 secured to the spindle 76. Thus on actuation of the link 101 the carry members 73 and 74 are simultaneously restored to their active positions.

From Figure 4 it will be seen that the subtraction carry pawls 54 are similar to the pawls 53 and have sloping faces 84 for engagement by the carry cams 52 during subtraction operations of the accumulator. The carry members 74 have tails 85 to abut against a fixed bar 86. Accordingly, it will be understood that during a subtraction operation of the accumulator a carry will be effected as above described but, in this instance, a digit will be subtracted from the register wheel 1 of the next lower denomination to that from which the carry is being effected.

When during a subtraction operation the amount registered by the register wheels passes from positive to negative, the carry member 74 associated with the units denomination register wheel is released so that when the units rack 7 is restored it is raised to one tooth position above its normal or zero starting position and adds an additional unit to the units register wheel, as described above, thereby accommodating the condition known in the art as the fugitive one.

Referring to Figures 1, 2 and 4, it will be seen that the latches 53, 54 of lowest and highest denominations are provided respectively with tails 87, 88 from which extend lateral pins 89, 90 located in slots 91, 92 formed in the upper ends of arms 93 and 94 secured to rocking spindles 95, 96 journalled in the side frames 3, 4. By means of this arrangement, whenever a latch 53 or 54 of highest denomination is tripped by its associated carry cam 51 or 52 it rocks the spindle 95 or 96 connected thereto and so trips the latch 53 or 54 of lowest denomination so that the rack 7 associated therewith is conditioned to add one unit to the register wheel of lowest denomination thereby zeroising the accumulator.

Similarly, during an adding operation of the accumulator if the amount registered passes from a negative to a positive, the units rack 7 operates, as above described, to add one unit to the register wheel of units denomination to accommodate the fugitive one condition.

The accumulator is also zeroised whenever a total-reading operation is effected and during this operation the register wheels 1 are rotated during the downward stroke of the racks 7 in a reverse direction from that in which they are normally rotated during an adding or subtracting operation until the back faces 97, 98, Figure 4, of the carry cams are arrested by the flat top edges of the latches 53, 54, according as to whether the accumulator registers a positive or a negative total.

The timing of the apparatus herein described is such that at the end of an adding or a subtracting operation the pinions 5 or 6, as appropriate, are left in mesh with the racks 7 and they are disengaged therefrom and returned to their inactive positions, as shown in Figure 4, just after the commencement of the next adding or subtracting operation during the downward movement of the racks 7. Further, the restoring bars 99, 100 also operate just after the commencement of said next operation.

As stated above, the plate 24 is normally positioned for an adding operation, and means are provided to ensure that after a subtracting operation the plate 24 is not restored to its normal adding position before complete change-over from the negative carry pawls 54 to the positive carry pawls 53 has been effected so that no carry is set during the change-over. These means are illustrated in Figs. 9 and 10 and comprise a pawl 160 integral with a boss 161, Fig. 10, which is freely mounted on the rocking spindle 35, and an arm 162 also integral with the boss 161. The pawl 160 is urged by a spring 163 into engagement with a tooth or notch 164 formed in the upper edge of one of the sliding plates 59. Thus when the plates 24 are lowered by the operating arms 36 the pawl 160 engaging in the tooth 164 prevents the spring 24a from swinging the plate 24 into engagement with the pin 30. When, however, the restoring bars 99, 100 are operated the bars engage the carry members 73, 74 and restore them to their active positions and just prior to the end of its restoring movement the bar 100 engages the arm 162 and rocks the pawl 160 out of engagement with the tooth 164 so that the sliding plates 59 are released and the plate 24 is moved by spring 24a into engagement with pin 30. It will, however, be understood that when the pawl 160 is released from tooth 164 the bars 99, 100, through carry members 73, 74, are controlling the racks 7 so that no carries can then be set on the racks.

An indicator arm 106, Figures 3 and 12, is provided to indicate whether the amount held by the accumulator is positive or negative and is provided to condition the accumulator during a total-reading operation when the amount registered is a negative amount. The arm 106 is fixed to a rocking pin 107 journalled in the side frame 4 and is provided with an abutment face 108 and with two notches 109, 110 for engagement by a spring detent 111, and when set, as shown in Figure 3, to indicate a negative amount the arm 106 abuts a stop pin 112.

The position of the arm 106 is determined by a pair of links consisting of a first link 115 and a second link 114, Figures 4 and 12, pivoted at 117 and 116 respectively to the opposite ends of a rocking arm 118 fixed to the pin 107. The links 114, 115 are sprung towards each other by a spring 119 and at their upper ends are provided with grooves 120, 121 in one or other of which is located a pin 122, Figures 4, 12 and 13, on a plate 123 having slots 124 at each end located over studs 125 fixed to the side frame 4. The pin 122 normally co-operates with the first link 115 and is arranged, as described below, for engagement by an abutment formed by a short pin 126, Figures 2 and 12, fixed to the side of the rack 7 of units denomination. As has been stated above, whenever the accumulator passes from registering a positive amount to registering a negative amount or vice versa, the units denomination rack is moved upwards one tooth position to accommodate the fugitive one condition. When this occurs the short pin 126 engages the pin 122 which, together with the plate 123, is raised. To a spindle 150 are fixed two arms 151 and 152. The arm 151 engages the back face of the restoring bar 99 and the arm 152 is connected by a link 153 to an arm 154 which is mounted on the side frame 3. An extension piece 155 on arm 154 rests on the top of a pin 156 fixed to the rear side of the plate 123. During a carry clearing operation, as the shafts 75 and 76 are rocked, the arm 151 is moved in a clockwise direction, as viewed in Figure 4, thus rocking the arm 154 and restoring the plate 123 to its rest or down position. During this movement the pin 122 which was placed in the top cut away portion 120 of the link 114 (due to the carry movement of the units slide) rocks the arm 118 and so sets the indicator arm 106. The arm 152 is sprung up by a spring 157 to relieve the load on the plate 123.

Let it now be assumed that a total-reading operation is to be effected and that the accumulator registers a negative amount. A total-reading operation requires two cycles, the first to clear any carries which may have occurred during the last registering cycle and the second to read the total. At the commencement of the first of the two cycles the arm 106 will be in the position shown in Figure 3 and at the beginning of the operation the pinions 5, 6 will be restored to their inactive positions and the plate 24 moved by its spring 24a to engage with the pin 30. Before operation of the operating arms 36 a feeler 127 is moved bodily by means, not shown, towards the arm 106 and as this arm indicates a negative amount on the register wheel the abutment face 108 is engaged by an overturned portion 128 at the upper end of the feeler. On engagement of the portion 128 with the face 108 continued movement of the feeler bodily causes it to be rotated anti-clockwise, as viewed in Figure 3, about its pivot 129 so that the tail 130 engages a block 131 projecting laterally from a depending arm 132 pivoted at 133 to the frame 4. The depending arm 132 is moved anti-clockwise by the tail 130 so that it engages the pin 134 fixed to the plate 24 and causes the plate 24 to be moved to engage the pin 31, as shown in Figure 3, thus conditioning the subtracting pinions 6 for meshing engagement with the racks 7 on actuation of the operating arms 36.

The remainder of the first cycle is as described above for a normal registering cycle but at the commencement of the second of the two cycles the pinions 6 remain in mesh with the teeth 9 but as the racks 7 are then moved downwards by the actuating members 15 and pinions 13 and the register wheels 1 are rotated anti-clockwise, as viewed in Figure 4, until they are arrested by the flat undersurfaces 98 of the carry cams 52 abutting against the tops of the carry pawls 54. Accordingly the racks 7 will move downwards by the number of tooth positions equal to the number of digits registered on the register wheels. The pinions 6 are then disengaged from the racks, the aligner bar is restored to engagement with the register wheels and the racks are restored to their zero or starting positions. It will be understood that during the downward movement of the racks the actuating members 15 move proportionately to the extent of downward movement of the racks and the movement of the members 15 is, as will be readily understood by those skilled in the art, employed to actuate printing and/or punching mechanism adapted to effect a record of the total read by the downward movement of the racks 7.

If when a total-reading operation is to be effected, the amount registered is positive the arm 106 will occupy the chain-dotted position indicated in Figure 3 and, on actuation of the feeler 127, the overturned portion 128 thereof will pass over the arm 106 and will not rock the depending arm 132. Accordingly, the plate 24 will, under the action of spring 24a, remain engaged with the pin 30 and the adding pinion 5 will be conditioned for meshing engagement with the racks 7 on actuation of the operating arms 36.

In the foregoing description, the pinions 5 and 6 have, for convenience, been described respectively as the adding and subtracting pinions. It will, however, be readily understood that these terms are relative and that, if desired, the pinion 5 may be arranged to be the subtracting pinion and the pinion 6 may be the adding pinion.

I claim:

1. An accumulator for statistical machines, comprising a plurality of rotatable and co-axial toothed denominational register wheels, an adding and a subtracting pinion for each said register wheel and constantly in meshing engagement therewith to rotate the wheel in opposite directions, a reciprocable digit-entering rack for each register wheel and having teeth on opposite sides thereof for meshing engagement with the pinions co-operating with the wheel, actuating means to move each said rack from a starting position thereof by a number of tooth positions representative of a digit to be entered on its registering wheel, an adding pinion spindle about which the adding pinions are freely rotatable, a subtracting pinion spindle about which the subtracting pinions are freely rotatable, a carrier member at each end of said spindles to support them for movement about an axis co-axial with that of the register wheels, a toothed quadrant for each carrier member and supported for rocking movement about said axis, springs connecting each carrier member to the quadrant co-operating therewith, an aligner bar common to the register wheels, a pair of cams operatively engaging the opposite ends of the aligner bar, cam-rocking pinions meshing with said toothed quadrants and co-operating with said cams to control movements of the aligner bar relative to the register wheels, a pair of pins extending from each carrier member, a rocking plate movable between each pair of pins and by engagement with one thereof to effect movement of a set of pinions from an inactive position thereof to meshing relation with the racks, adding and subtracting carry cams integral with each register wheel, a set of adding carry pawls and a set of subtracting carry pawls each pivotally mounted for co-operation with the carry cams, a pivoted adding carry member and a pivoted subtracting carry member for each carry pawl, a latch movable with each carry pawl normally to latch in active position the carry member for the register wheel of next denomination, and abutments on each said rack for engagement by the carry members therefor when the rack is in the zero position thereof whereby on release of a carry member for movement to its inactive position the rack is permitted to advance one unit position beyond its zero position so that on the next movement of the rack from its starting position an additional unit is entered on the register wheel co-operating therewith.

2. An accumulator according to claim 1, including a rocking pin, an indicator arm rockable with the rocking pin to give an indication as to whether an amount registered by the registering wheels is positive or negative, a rocking arm rockable with the rocking pin, a first and a second link pivoted respectively to the opposite ends of the rocking arm and spring-urged towards each other, a slotted plate supported for lengthwise movement relative to said links, a pin extending from the plate normally to co-operate with said first link, an abutment carried by the toothed rack of units denomination for co-operation with said last-mentioned pin on movement of the rack to accommodate a fugitive one condition thereby to move the pin to co-operate with said second link, an abutment on said plate, a rocking arm engaging the abutment on the plate, and a rocking arm linkage operable by said adding restoring member to restore said pin to the normal position of co-operation thereof with said first link and thereby to rock the rocking arm to effect operation of the indicator arm.

3. An accumulator for statistical machines, comprising a plurality of rotatable and co-axial toothed denominational register wheels, an adding and a subtracting pinion for each said register wheel and constantly in meshing engagement therewith to rotate the wheel in opposite directions, a reciprocable digit-entering rack for each register wheel and having teeth on opposite sides thereof for meshing engagement with the pinions co-operating with the wheel, actuating means to move each said rack from a starting position thereof by a number of tooth positions representative of a digit to be entered on its registering wheel, an adding pinion spindle about which the adding pinions are freely rotatable, a subtracting pinion spindle about which the subtracting pinions are freely rotatable, a carrier member at each end of said spindles to support them for movement about an axis co-axial with that of the register wheels, a toothed quadrant for each carrier member and supported for rocking movement about said axis, springs connecting each carrier member to the quadrant co-operating therewith, an aligner bar common to the register wheels, a pair of cams operatively engaging the opposite ends of the aligner bar, cam-rocking pinions meshing with said toothed quadrants and co-operating with said cams to control movements of the aligner bar relative to the register wheels, a pair of pins extending from each carrier member, a rocking plate movable between each pair of pins and by engagement with one thereof to effect movement of a set of pinions from an inactive position thereof to meshing relation with the racks, adding and subtracting carry cams integral with said register wheel, a set of adding carry pawls and a set of subtracting carry pawls each pivotally mounted for co-operation with the carry cams, a pivoted adding carry member and a pivoted subtracting carry member for each carry pawl, a latch movable with each carry pawl normally to latch in active position the carry member for the register wheel of next denomination, abutments on each said rack for engagement by the carry members therefor when the rack is in the zero position thereof whereby on release of a carry member for movement to its inactive position the rack is permitted to advance one unit position beyond its zero position so that on the next movement of the rack from its starting position an additional unit is entered on the register wheel co-operating therewith, sliding plates connected with said rocking plates for lengthwise movement on rocking of the rocking plates, and rods carried by the sliding plates for movement therewith simultaneously to move one set of carry pawls to the active positions thereof and the other set to the inactive positions thereof.

4. An accumulator according to claim 3, including a rocking pin, an indicator arm rockable with the rocking pin to give an indication as to whether an amount registered by the registering wheels is positive or negative, a rocking arm rockable with the rocking pin, a first and a second link pivoted respectively to the opposite ends of the rocking arm and spring-urged towards each other, a slotted plate supported for lengthwise movement relative to said links, a pin extending from the plate normally to co-operate with said first link, an abutment carried by the toothed rack of units denomination for co-operation with said last-mentioned pin on movement of the rack to accommodate a fugitive one condition thereby to move the pin to co-operate with said second link, an abutment on said plate, a rocking arm engaging the abutment on the plate, and a rocking arm linkage operable by said adding restoring member to restore said pin to the normal position of co-operation thereof with said first link and thereby to rock the rocking arm to effect operation of the indicator arm.

5. An accumulator according to claim 3 including a tooth on one of said sliding plates, a pivoted retarding pawl spring-urged into engagement with said tooth to retard rocking movement of the rocking plates from the subtracting to the adding positions thereof, and an arm movable with the retarding pawl and operable by the restoring member for the subtracting carry members whereby the subtracting carry members control the racks prior to movement of the rocking plates from the subtracting to the adding position thereof.

6. An accumulator for statistical machines, comprising a plurality of rotatable and co-axial toothed denominational register wheels, an adding and a subtracting pinion for each said wheel and constantly in meshing engagement therewith to rotate the wheel in opposite directions, a reciprocable digit-entering rack for each register wheel and having teeth on opposite sides thereof for meshing engagement with the pinions co-operating with the wheel, actuating means to move each said rack from a starting position thereof by a number of tooth positions representative of a digit to be entered on its register wheel, an adding pinion spindle about which the adding pinions are freely rotatable, a subtracting pinion spindle about which the subtracting pinions are freely rotatable, a carrier member at each end of said spindles to support them for rocking movement about an axis co-axial with that of the register wheels, carry-over means to effect a carry from one register wheel to the next, an aligner bar common to the register wheels and supported for movement into and out of engagement with the teeth of the wheels, a toothed quadrant for each carrier member and supported for rocking movement about said axis, springs connecting each carrier member to the quadrant co-operating therewith, a pair of cams supported for rocking movement and operatively engaging the opposite ends of said aligner bar, and cam-rocking pinions to mesh with said quadrants on angular movement thereof thereby to effect said engagement or disengagement of the aligner bar with the register wheels.

7. An accumulator for statistical machines, comprising a plurality of rotatable and co-axial toothed denominational register wheels, an adding and a subtracting pinion for each said wheel and constantly in meshing engagement therewith to rotate the wheel in opposite directions, a recirocable digit-entering rack for each register wheel and having teeth on opposite sides thereof for meshing engagement with the pinions co-operating with the wheel, actuating means to move each said rack from a starting position thereof by a number of tooth positions representative of a digit to be entered on its register wheel, an adding pinion spindle about which the adding pinions are freely rotatable, a subtracting pinion spindle about which the subtracting pinions are freely rotatable, a carrier member at each end of said spindles to support them for rocking movement about an axis co-axial with that of the register wheels, carry-over means to effect a carry from one register wheel to the next, an aligner bar common to the register wheels and supported for movement into and out of engagement with the teeth of the wheels, rocking plates to effect rocking of the carrier members, an indicator to give an indication when the register wheels register a negative amount, and indicator operating means connecting said indicator with the rack of lowest denomination for actuation thereby on rocking of said rocking plates to condition the accumulator for a subtracting operation.

References Cited in the file of this patent

UNITED STATES PATENTS

| | | |
|---|---|---|
| 2,088,982 | Sundstrand | Aug. 3, 1937 |
| 2,160,296 | Sundstrand | May 30, 1939 |
| 2,203,533 | Landsiedel | June 4, 1940 |
| 2,285,311 | Sundstrand | June 2, 1942 |

FOREIGN PATENTS

| | | |
|---|---|---|
| 479,234 | Great Britain | Dec. 21, 1936 |